May 5, 1931.  M. M. RODIN  1,803,561
FISHHOOK
Filed Sept. 17, 1929
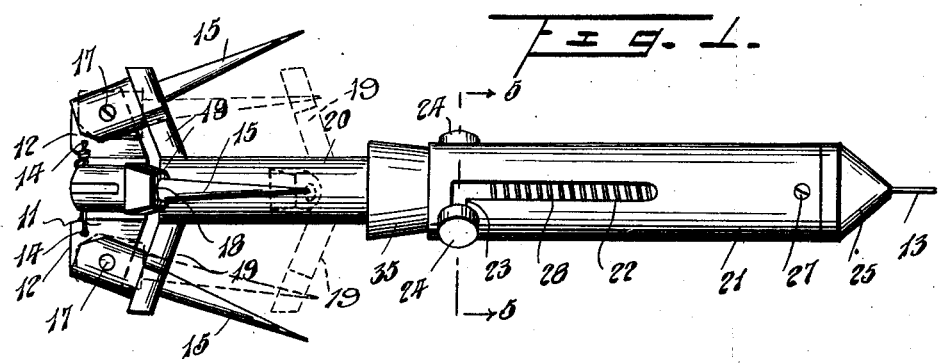
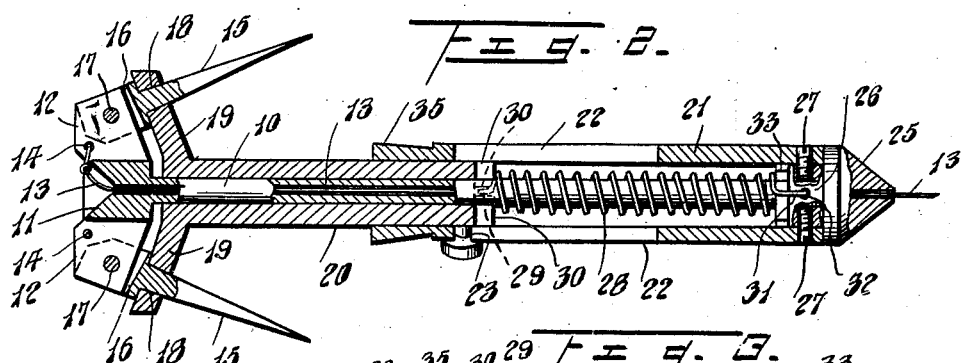
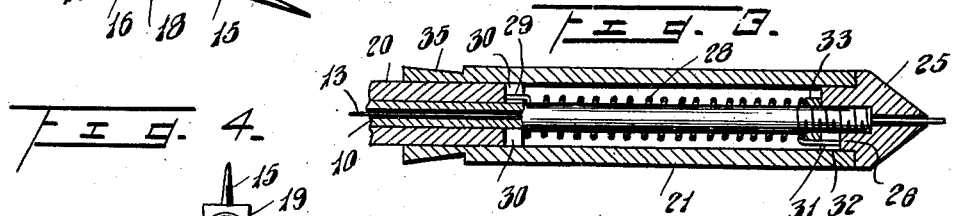
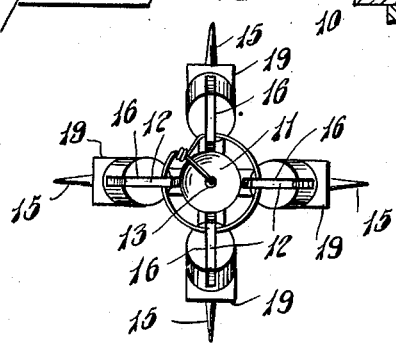
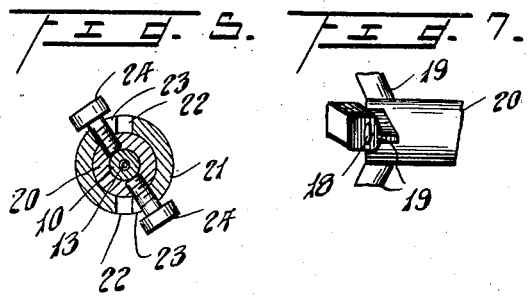
Inventor
M. M. Rodin.
By
Attorney Patented May 5, 1931

1,803,561

UNITED STATES PATENT OFFICE

MATE MIKE RODIN, OF SAN PEDRO, CALIFORNIA

FISHHOOK

Application filed September 17, 1929. Serial No. 393,139.

This invention relates to a fish hook for catching fish.

It is primarily aimed to provide a novel construction having means operable to readily strip or remove the same from the mouth of a caught fish.

Another object is to provide novel means whereby the stripping member or mechanism is normally incapable of operation.

Further it is aimed to provide novel means whereby the line can be very securely attached and a construction in which the parts are sturdy and capable of disassembly for inspection or repair.

The more specific objects and advantages will become apparent in the description following taken in connection with the accompanying drawings illustrating an operative embodiment.

In said drawings:—

Figure 1 is a view of the invention in side elevation,

Figure 2 is a view of the invention in substantially central longitudinal section, Figure 3 is a fragmentary section similar to Figure 2 of the upper end of the device and showing the position assumed when the stripping means is at the end of stripping movement, Figure 4 is an end elevation of the device, Figure 5 is a cross sectional view taken on the line 5—5 of Figure 1, Figure 6 is a detail sectional view of the stripper, and Figure 7 is a detail perspective of a portion of the stripper.

Referring specifically to the drawings, wherein like reference characters designate like or similar parts, the hook or catching device comprises a tubular rod 10 having an enlarged head 11 at the lower end from which ribs 12 of any desired number, radiate. The rod 10 is hollow and a metallic wire 13 or the fishing line may pass therethrough and be secured in openings 14 provided in the ribs 12. If the element 13 be a metallic wire, the line is adapted to be fastened thereto above the device in any suitable manner.

Catching hooks, bobs, or spurs 15 have bifurcated portions 16 which straddle the ribs 12 and are pivotally connected thereto by pins at 17. Such members 15 normally are in diverging relation as shown in full lines in the drawings and are normally held in that position since they extend through openings 18 provided in radiating arms 19, which serve as strippers, and which are integral with a tubular stripping body 20 which is slidable along the rod. The sliding movement of the stripper 20 causes the spurs 15 at their free ends to move inwardly to the dotted line position shown in Figure 1, and hence in the event a fish is caught and the stripper 20 is moved the device may be readily extracted from the mouth of the fish.

Surrounding the upper portion of rod 10 and the stripper sleeve 20 is a barrel 21 having L-shaped slots 22 on opposite sides thereof, the lateral branches of said slots being designated 23. Screws 24 which constitute manipulating finger pieces extend through the slots 22 and are screw-threaded into the sleeve body 20.

A suitable cap 25 partly telescopes into the barrel 21 and has an inner portion 26 engaged by set screws 27 passed through openings in the barrel and screw-threaded therein. The cap 25 is hollow and the wire or line 13 passes therethrough as shown.

Surrounding the rod 10 within the barrel 21 is an expansive coil spring 28 one end of which 29 is adapted to extend into a longitudinal slot 30 provided in the upper end of the tube 20, and the other terminal as at 31 is adapted to extend into a slot 32 provided in the portion 26 of the cap. A nut 33, is screw threaded to the upper end of the stem 10 to hold the spring 28 in place and at the proper tension and the portion 26 of the cap is also screw threaded to the upper end of said stem or rod 10 as shown in Figure 3.

It will be realized that the expansion of the spring 28 normally maintains the stripper 20 in its retracted position as shown in full lines in the drawings and that when the stripper is to be operated, the elements 24 are engaged by the fingers and moved so as to dispose them out of the lateral branches 23 of slots 22 and move them in line with the longitudinal portions thereof whereby said members 24 together with the stripper may be moved from the full line to the dotted line position shown in Figure 1, to strip a fish therefrom. Thereafter the parts will be urged toward retracted position by the spring 28 and relative movement of the barrel 21 or stripper will dispose the screws 24 in the branches 23, in which position relative longitudinal movement of the stripper and rod 10 is prevented.

It will be realized that the device is primarily adapted for trolling and will spin in the water. As usual, the catching members are preferably covered by feathers or the like and to accommodate their attachment, the barrel 21 is reduced as at 35. It will be realized that the barrel 21 may be made from any shiny or bright metal or other material with a view to serving as an effective lure for fish.

Various changes may be resorted to provided they fall within the spirit and scope of the invention.

I claim as my invention:—

1. A fishing means of the class described comprising a rod, a catching member extending therefrom and including spurs pivotally secured to said rod, a stripping member slidable on said rod, and arms on said stripping member provided with openings to receive said spurs.

2. A fishing means of the class described comprising a rod, a catching member extending therefrom and including spurs pivotally secured to said rod, a stripping member slidable on said rod, and arms on said stripping member provided with openings to receive said spurs, said catching member being movably mounted whereby movement of the stripping member will actuate the free ends of said spurs inwardly toward the rod incidental to stripping action.

3. A fishing means of the class described comprising a rod, a catching member extending therefrom, and a stripping member movable along the catching member, spring means normally maintaining the stripper member retracted, a barrel coacting with the stripping member to normally prevent movement thereof relative to the catching member.

4. A fishing means of the class described comprising a rod, a catching member pivoted thereto, a stripping member having an opening through which the catching member extends, a sleeve movable longitudinally and rotatable relative to the rod and stripping member, a cap carried by the sleeve, an expansive spring surrounding the rod within the barrel and engaging said cap and said stripping member, and means for interengagement between the stripping member and the barrel to normally prevent relative movement of the stripping member and the catching member.

5. A fishing means of the class described comprising of rod having ribs radiating therefrom, catching members pivoted to the ribs, a tubular stripper slidable along the rod having arms provided with openings through which the catching members extend, a barrel slidable and rotatable relative to the rod and stripping member, a cap on said barrel, a spring surrounding the rod and engaging the cap and said stripping member, said cap and stripping member having slots to receive the extremities of said spring, said barrel having a substantially L-shaped slot and a projection on said stripping member disposed in said slot.

6. A fishing means of the class described comprising a rod having ribs radiating therefrom, catching members pivoted to the ribs, a tubular stripper slidable along the rod having arms provided with openings through which the catching members extend, a barrel slidable and rotatable relative to the rod and stripping member, a cap on said barrel, a spring surrounding the rod and engaging the cap and said stripping member, said cap and stripping member having slots to receive the extremities of said spring, said barrel having a substantially L-shaped slot and a projection on said stripping member disposed in said slot, said rod and cap being hollow and the ribs having openings therethrough for the purpose specified, said cap having a portion screw-threaded on the upper end of the rod and telescoped in said barrel, and a connection between the barrel and said telescoped portion of the cap.

In testimony whereof I affix my signature.

MATE MIKE RODIN.